United States Patent
Faitelson et al.

(10) Patent No.: US 9,894,071 B2
(45) Date of Patent: *Feb. 13, 2018

(54) VISUALIZATION OF ACCESS PERMISSION STATUS

(71) Applicant: Varonis Systems Inc., Saddle Brook, NJ (US)

(72) Inventors: Yakov Faitelson, Elkana (IL); Ohad Korkus, Tel Aviv (IL); Ophir Kretzer, Reut (IL)

(73) Assignee: Varonis Systems Inc., Saddle Brook, NJ (US)

( * ) Notice: Subject to any disclaimer, the term of this patent is extended or adjusted under 35 U.S.C. 154(b) by 693 days.

This patent is subject to a terminal disclaimer.

(21) Appl. No.: 14/510,479

(22) Filed: Oct. 9, 2014

(65) Prior Publication Data

US 2015/0058932 A1 Feb. 26, 2015

Related U.S. Application Data

(63) Continuation of application No. 13/887,875, filed on May 6, 2013, now Pat. No. 8,881,232, which is a
(Continued)

(51) Int. Cl.
  *G06F 17/30* (2006.01)
  *H04L 29/06* (2006.01)
  *G06F 21/62* (2013.01)

(52) U.S. Cl.
  CPC ........ *H04L 63/10* (2013.01); *G06F 17/30126* (2013.01); *G06F 17/30587* (2013.01); *G06F 21/6218* (2013.01)

(58) Field of Classification Search
  CPC .................................................. G06F 17/30126
  (Continued)

(56) References Cited

U.S. PATENT DOCUMENTS 5,465,387 A  11/1995 Mukherjee
7,716,240 B2  5/2010 Lim
(Continued)

FOREIGN PATENT DOCUMENTS

CN  1588889  3/2005

OTHER PUBLICATIONS

Article entitled "DatAdvantage 2.0 User Guide", dated Aug. 24, 2006.*
(Continued)

*Primary Examiner* — Mahesh Dwivedi
(74) *Attorney, Agent, or Firm* — Fish & Richardson P.C.

(57) ABSTRACT

Queries regarding access permissions of users and rights to directories in a complex enterprise are executed in near real-time, using lookups to tables that form a condensed database maintained for each file server. User information is condensed by arranging users in user groups having common data access rights. Directory permissions storage is condensed by showing only distinctive permissions to a directory in a table entry, and referencing inherited permissions of parent directories. The tables indicate recursive and ancestral relationships among the user groups and directories. They are developed and updated in advance of any queries. A consolidated view of the query results is presented on a single display screen. Using the tables results can be obtained without exhaustive searches of large file system tables.

12 Claims, 10 Drawing Sheets

Related U.S. Application Data continuation of application No. 11/871,028, filed on Oct. 11, 2007, now Pat. No. 8,438,611.

(58) Field of Classification Search
USPC .............................................................. 726/2
See application file for complete search history.

(56) References Cited

U.S. PATENT DOCUMENTS

| | | | |
|---|---|---|---|
| 8,438,611 | B2 | 5/2013 | Faitelson |
| 8,438,612 | B2 | 5/2013 | Faitelson |
| 2004/0054919 | A1 | 3/2004 | Duri |
| 2004/0254919 | A1 | 12/2004 | Giuseppini |
| 2005/0065823 | A1 | 3/2005 | Ramraj |
| 2005/0086529 | A1 | 4/2005 | Buchsbaum |
| 2005/0203881 | A1 | 9/2005 | Sakamoto |
| 2005/0246762 | A1 | 11/2005 | Girouard |
| 2006/0277184 | A1* | 12/2006 | Faitelson ............ G06F 21/316 |
| 2007/0033340 | A1 | 2/2007 | Tulskie |
| 2007/0073698 | A1 | 3/2007 | Kanayama |
| 2007/0094265 | A1* | 4/2007 | Korkus ............... G06F 21/316 |
| 2007/0101287 | A1 | 5/2007 | Pagan |
| 2007/0101387 | A1* | 5/2007 | Hua ................. G06F 17/30793 |
| | | | 725/113 |
| 2007/0112743 | A1 | 5/2007 | Giampaolo |
| 2007/0156693 | A1 | 7/2007 | Soin |
| 2007/0198608 | A1 | 8/2007 | Prahlad |
| 2007/0203872 | A1 | 8/2007 | Flinn |
| 2007/0266006 | A1 | 11/2007 | Buss |
| 2007/0276823 | A1 | 11/2007 | Borden |
| 2007/0282855 | A1 | 12/2007 | Chen |
| 2008/0172720 | A1 | 7/2008 | Botz |
| 2008/0271157 | A1 | 10/2008 | Faitelson |
| 2009/0100058 | A1 | 4/2009 | Faitelson |
| 2009/0119298 | A1 | 5/2009 | Faitelson |
| 2009/0150981 | A1 | 6/2009 | Amies |
| 2009/0182715 | A1 | 7/2009 | Falkenberg |
| 2009/0320088 | A1 | 12/2009 | Gill |

OTHER PUBLICATIONS

Office Action dated Sep. 19, 2010, which issued during the prosecution of U.S. Appl. No. 11/871,028. 77 pages.
An Office Action dated Sep. 14, 2012, which issued during the prosecution of U.S. Appl. No. 12/861,967.
An Office Action dated Aug. 28, 2012, which issued during the prosecution of U.S. Appl. No. 12/673,691.
An International Search Report and a Written Opinion both dated Jun. 14, 2011 which issued during the prosecution of Applicant's PCT/IL11/00066.
Article entitled "DatAdvantage 2.0 User Guide", dated Aug. 24, 2006 by Varonis.
DatAdvantage User Guide by Varonis, Version 1.0, Aug. 30, 2005.
DatAdvantage User Guide by Varonis, Version 2.0, Aug. 24, 2006.
DatAdvantage User Guide by Varonis, Version 2.5, Nov. 27, 2006.
DatAdvantage User Guide by Varonis, Version 2.6, Dec. 15, 2006.
DatAdvantage User Guide by Varonis, Version 2.7, Feb. 6, 2007.
DatAdvantage User Guide by Varon is, Version 3.0, Jun. 20, 2007.
A List of database tables in DatAdvantage 2.7, Feb. 6, 2007.
A List of all the Versions of the DatAdvantage Product and User Guide by Varon is. Jun. 20, 2007.
A List of database tables in DatAdvantage 3.0, Jun. 20, 2007.
Article entitled "DatAdvantage 3.0 User Guide", dated Jul. 31, 2007, by Varonis.
Article entitled "Varonis Prevents Unauthorized Access to Unstructured Data" by Woodie, dated Jul. 31, 2007.
Article entitled "Accelerating Audits with Automation: Understand Who's Accessing Your Unstructured Data" by Varon is, dated Oct. 8, 2007.
Article entitled "The Business Case for Data Governance" by Varon is, dated Mar. 27, 2007.
Article entitled "Entitlement Reviews: A Practitioner's Guide" by Varon is, dated Oct. 8, 2007.
An Office Action dated Dec. 14, 2010, which issued during the prosecution of Applicant's U.S. Appl. No. 11/789,884.
An Office Action dated Dec. 14, 2010, which issued during the prosecution of Applicant's U.S. Appl. No. 11/786,522.
De, Sahadeb. et. al. "Secure Access Control in a Multi-user Geodatabase," http://www10.giscafe.com.
U.S. Appl. No. 60/688,486, filed Jun. 7, 2005 entitled "A Method and System for Automatic Management of Storage Access Control."
U.S. Appl. No. 11/786,522.
An Office Action dated Sep. 16, 2010, which issued during the prosecution of U.S. Appl. No. 11/871,028.
An Examiner Interview Summary dated Oct. 22, 2010, which issued during the prosecution of U.S. Appl. No. 11/871,028.
An Examiner Interview Summary dated Feb. 10, 2011, which issued during the prosecution of U.S. Appl. No. 11/871,028.
An Office Action dated Apr. 28, 2011, which issued during the prosecution of U.S. Appl. No. 11/871,028.
An Advisory Action dated Aug. 8, 2011, which issued during the prosecution of U.S. Appl. No. 11/871,028.
A Notice of Allowance dated Jan. 10, 2013, which issued during the prosecution of U.S. Appl. No. 11/871,028.

* cited by examiner

VISUALIZATION OF ACCESS PERMISSION STATUS

BACKGROUND OF THE INVENTION

1. Field of the Invention

This invention relates to computer security. More particularly, this invention relates to visualization of user access permissions on a computer system.

2. Description of the Related Art

Data security policies typically determine who has access to an organization's stored data on various computer systems. These policies are rarely static. Users from within the organization, e.g., employees, partners, contractors, can pose a threat as severe as threats from outside the organization. Thus, as the structure and personnel makeup of the organization change, the security policy should be adjusted from time to time. Yet, information technology departments often find it difficult to manage user access rights and to ensure that needed information is conveniently available, while still protecting the organization's sensitive data.

Large business organizations may operate enterprise computer systems comprising large numbers of servers, often geographically distributed. Storage elements in these systems may be accessible in many combinations by large numbers of users, possibly numbering in the hundreds of thousands. Various personnel associated with data access authorizations, including information technology personnel, operational personnel such as account managers, and third party reviewers such as the legal department of the enterprise, may need to routinely inquire as to user access rights to enterprise data.

Maintaining a conventional localized or distributed database suitable to respond to queries for determining the privileges of any particular user or group of users within the enterprise, or conversely, to determine the privileges relating to a particular storage element or group of storage elements, could overwhelm even the capabilities of today's sophisticated database management programs. Storage and retrieval of such data as needed to service queries may have an adverse affect on the storage capacities of various servers. Execution of such queries may impact performance of the servers, and would impair the overall efficiency of the enterprise. Because response to such queries often necessitates an exhaustive iterative search through the directories of many file servers and their access control lists, the response time of such queries becomes unacceptably prolonged.

Access control technologies have not been optimally implemented in enterprises that utilize diverse access control models. The state of the art today is such that there is no easy way for system administrators to know who is capable of accessing what in such environments. As a result, in many organizations an unacceptably high proportion of users has incorrect access privileges. The related problems of redundant access rights and orphan accounts of personnel who have left the organization have also not been fully solved. Hence, there is a need for improvements in controlling user file permissions in order to improve data security, prevent fraud, and improve company productivity. Furthermore, misuse of data access, even by authorized users, is a concern of those charged with simplification and automation of system security.

Current techniques available to information technology personnel include review and maintenance of access control lists, in conjunction with administration of user names, passwords, and the extension of such techniques to include biometrics, encryption, and limitation of access to a single sign-on. Such techniques are inefficient, often inaccurate, and become impractical in the context of large, complex organizations whose structure and personnel are constantly changing.

SUMMARY OF THE INVENTION

According to disclosed embodiments of the invention, queries that reveal access permissions of users and rights to directories in an enterprise are executed in near real-time. Using an efficient storage technique, lookups to tables having abbreviated entries are performed, and exhaustive searches of large file system tables are avoided. A consolidated view of the query results is presented on a single display screen, which may combine results from geographically diverse file servers. User information is condensed by arranging users in user groups having common data access rights. Directory permission storage is condensed by showing only distinctive permissions to a directory in a table entry, and referencing inherited permissions of parent directories. The user information and directory permission are maintained per server as a relatively small database.

An embodiment of the invention provides a method for displaying data access privileges for data in an enterprise, which is carried out by defining user groups offering common rights of access to a plurality of file servers. The file servers are organized as a hierarchy of storage elements. The storage elements comprise nondistinctive elements that offer only access privileges that are inherited from ancestors thereof, and distinctive elements that offer at least non-inherited access privileges. The method is further carried out by maintaining a directory database only for the distinctive elements, entries in the directory database including one of the distinctive elements and a list that identifies other distinctive elements that are ancestral thereto in the hierarchy. The method is further carried out by consulting the directory database to determine a directory-oriented set of the user groups that offer common rights of access to selected ones of the storage elements.

In an aspect of the method, the directory database includes a first directory database and a second directory database. The method is further carried out by defining first user groups and second user groups, the first directory database and the first user groups including currently existing information, and the second directory database and the second user groups including proposed modifications to the first directory database and the first user groups, respectively. The method is further carried out by consulting the first directory database and the first user groups and consulting the second directory database and the second user groups to determine a first directory oriented set and a second directory oriented set, respectively, and reporting a difference between the first directory oriented set and the second directory oriented set.

In one aspect of the method, the user groups comprise ancestral user groups having members that are other user groups, and participant members of the other user groups have access rights that derive from the user groups and respective the ancestral user groups thereof. The method is further carried out by maintaining a user database of the user groups and the members, entries in the user database including identifiers of respective ancestral user groups, and consulting the user database to determine a user-oriented set of user groups offering respective common rights of access to selected ones of the participant members.

One aspect of the method includes reporting members of the directory-oriented set and the user-oriented set.

Another aspect of the method includes making a determination that the user-oriented set has an intersection with the directory-oriented set, and responsively to the determination issuing a report that the participant members are able to access the selected ones of the storage elements.

In a further aspect of the method, only the distinctive elements are reported.

In yet another aspect of the method, the user database includes a first user database of actual user groups in the enterprise and a second user database of proposed user groups, and the directory database includes a first directory database of actual non-inherited access privileges of the actual user groups and a second directory database of proposed non-inherited access privileges of the proposed user groups, wherein consulting the user database, consulting the directory database, making a determination, and issuing a report are performed a first time using the first directory database, and the first user database to issue a first report and performed a second time using the second user database and the second directory database to issue a second report, and presenting a single display of the first report and the second report.

According to still another aspect of the method, the single display includes a first pruned tree display of the storage elements including the first report and a second pruned tree display of the storage elements including the second report.

In an additional aspect of the method, the user database includes a table of memberships wherein entries identify user groups that respectively offer common rights of access to the participant members, and a table of relationships having entries identifying respective relationships among the user groups and the ancestral user groups thereof. The method is further carried out prior to consulting the user database by constructing the table of memberships and the table of relationships and updating the table of memberships and the table of relationships responsively to changes in a composition of any of the user groups.

In one aspect of the method, the directory database includes a table of permissions, wherein entries identify one of the user groups and a respective one of the distinctive elements, a table of derived relationships, wherein entries identify one of the distinctive elements and a respective instance of the list. The method is further carried out prior to consulting the directory database by constructing the table of permissions and the table of derived relationships and updating the table of permissions and the table of derived relationships responsively to changes in the non-inherited access privileges.

Other embodiments of the invention provide computer software product and apparatus for carrying out the above-described method.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
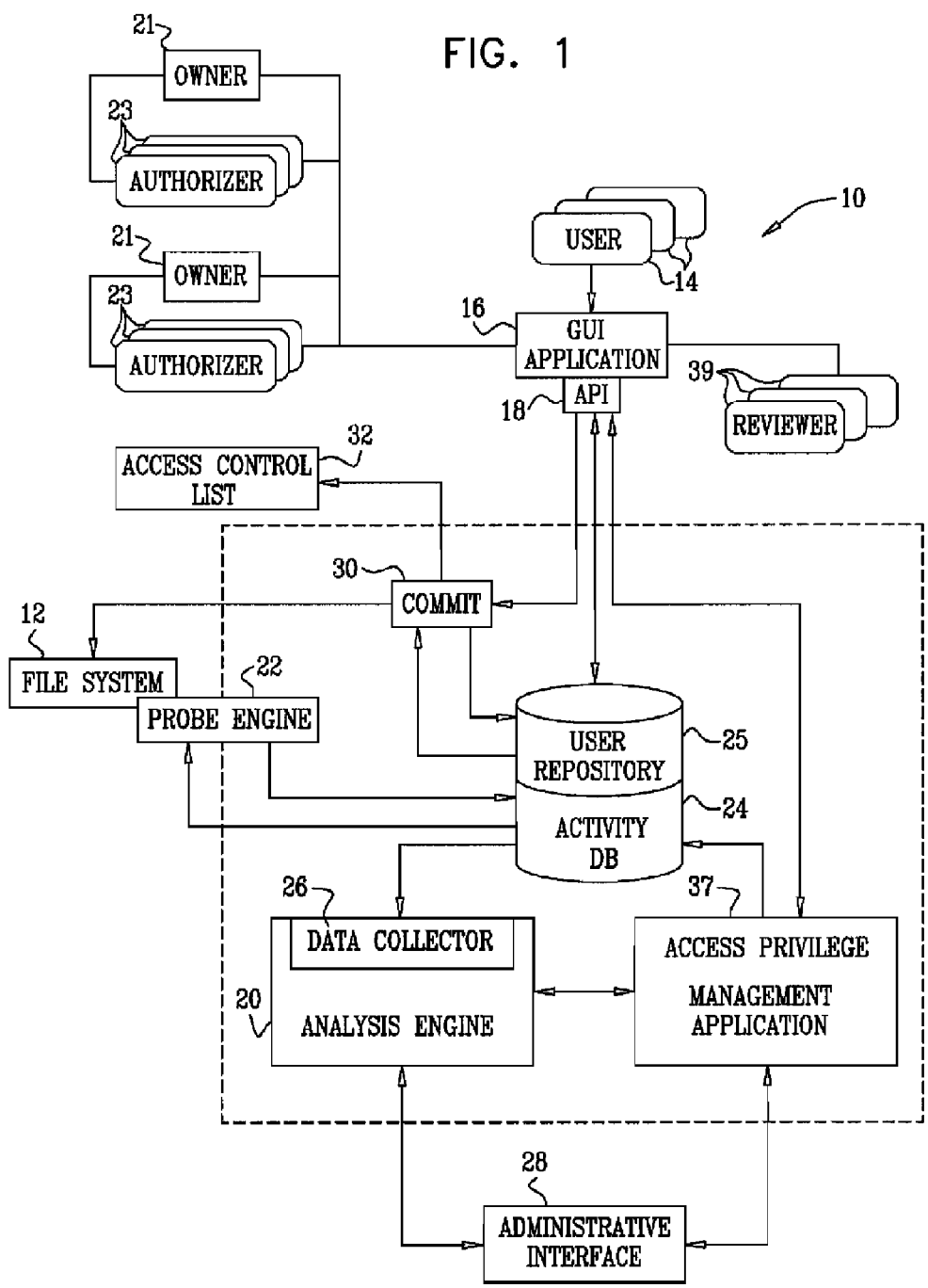
FIG. 1 is a block diagram of a data processing system 10, having provisions for visualizing data access rights management in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Terminology.

Table 1 explains certain terminology used herein.

TABLE 1

| | |
|---|---|
| ACL | Access control list. A list of permissions attached to an object. The list specifies who is allowed to access the object and what operations are allowed to be performed on the object. In a typical ACL, each entry specifies a subject or group of subjects and an operation: for example, the entry (Alice, delete) |

TABLE 1-continued

| | |
|---|---|
| | on the ACL for file XYZ gives Alice permission to delete file XYZ. |
| Organizational unit. | A user repository container that can include users, groups, computers, and other organizational units. It is often defined to mirror an organization's functional or business structure. |

Overview.

One aspect of the invention provides rapid response to queries regarding access privileges to enterprise data, and displays results as a consolidated view of the information, often on a single screen. Thus, it is possible for qualified administrative personnel, respective owners of the storage elements and their delegates to quickly be informed of user access rights to storage elements of an organizational file system.

User groups having common data access rights are interactively established by administrators or owners using the folder management application. Additionally or alternatively, user groups may be automatically established using biclustering techniques, which are disclosed in commonly assigned application Ser. No. 11/258,256, entitled "Automatic Management of Storage Access Control", which is herein incorporated by reference. The responsibility for managing changes in access privileges to storage elements in the file system may be centralized in an information technology activity. However, it may also devolve upon respective owners of the storage elements, who may further delegate responsibility for the same or different portions of the storage elements falling under their responsibility to "authorizers". Techniques for the decentralization of user access privilege management are taught in commonly assigned application Ser. No. 11/786,522, entitled "Automatic Folder Access Management", which is herein incorporated by reference.

Turning now to the drawings, reference is initially made to FIG. 1, which is a block diagram of a data processing system 10, wherein data access rights in an enterprise can be visualized in accordance with a disclosed embodiment of the invention. The system 10 may be implemented as a general purpose computer or a plurality of computers linked together in a network, for example the Internet. Thus, although the system 10 is shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors on tangible media, such as CD-ROM or non-volatile memory. Alternatively or additionally, the system 10 may comprise a digital signal processor or hardwired logic.

Organization-wide data storage accessible by the system 10 is represented by an organizational file system 12. The file system 12 may comprise one or more co-located storage units. More typically, it may be a geographically distributed data storage system. There is no requirement that individual storage units of the file system 12 have the same capabilities. Storage elements in the file system 12 have an ownership attribute. Within an organization's file system, there are typically many owners 21, each having ownership of a portion of the storage elements, e.g., folders, that are stored in the file system.

The file system 12 may be accessed by any number of users 14 using a graphical user interface application 16 (GUI), which relates to other elements of the system 10 via an application programming interface 18 (API). The users 14 are typically members of the organization, but may also include outsiders, such as customers. The graphical user interface application 16 is also the interface for management functions of the system 10. For example, the users 14 may be enabled to receive the results of their actual usage analysis, as determined by an analysis engine 20. Sufficiently qualified users, owners 21 and their delegates, authorizers 23, can view their current status, and can view proposed changes. The owners 21 and authorizers 23 may be authorized to accept or reject recommended or requested changes. In a complex organization, the owners 21 may be executives of a business unit, and the authorizers 23 would be their subordinates. There may be any number of authorizers 23 associated with different owners 21, and different authorizers 23 may be authorized to control the same or different portions of the storage elements in the file system 12 that are owned by the associated owner.

A probe engine 22 is designed to collect historical user access information from the file system 12 in an ongoing manner, filter out duplicate or redundant information units and store the resulting information stream in an activity database 24. The probe engine 22 is also utilized to collect information related to the organization's current file security policy, the current structure of the file system 12, and information about the users 14. The probe engine 22 can be implemented in various environments and architectures. By collecting actual data usage information, the probe engine 22 provides coverage of what data is currently available to users across an unlimited number of users and data, as well as what data is actually being accessed and used. The system 10 relies on the probe engine 22 to provide a basis for full and accurate usage visibility. The probe engine 22 is completely transparent to system operations. All data collection processes are continuously monitored, and terminated if performance degradation is detected, assuring an unobtrusive operation.

The database 24 is linked to a user repository 25, which maintains a list of user identifications, states, roles, group memberships, and passwords. The user repository 25 can be realized as the Active Directory® service, available from Microsoft Corporation, Redmond, Wash. The user repository 25 is a logical unit that may be distributed in one or more enterprise servers, e.g., a domain controller. In addition to user information, the user repository 25 facilitates assignment of enterprise-wide policies, deployment of programs, and application of critical updates to the entire organization.

The analysis engine 20 is a specialized module that continually aggregates and clusters data events and directory structure information to accurately profile and classify data usage. The analysis engine 20 automatically maps data to users, and vice versa, making sense of data usage patterns to provide an understanding of data owners and who should be accessing data while pinpointing potential data usage risks. In one aspect of its operation, the analysis engine 20 deals with defining normal activity profiles and detecting atypical or exceptional data access activity by the users 14. The front end for the analysis engine 20 is a data collector 26, which efficiently records the storage access activities in the database 24. The output of the analysis engine 20 can be further manipulated using an interactive administrative interface 28 that enables system administrators to perform queries on the collected data.

Related to the analysis engine 20 is a commit module 30, which verifies ongoing user compliance with a governing or proposed security policy, using data collected prior to its implementation. The commit module 30 references an access control list 32 (ACL). Activities of the analysis engine 20 and the commit module 30 are described in further detail in the above noted application Ser. No. 11/258,256.

A specialized access privilege management application 37 is linked to users 14, owners 21, authorizers 23, and third party reviewers 39 via the application programming interface 18 and the user interface application 16. The management application 37 is adapted to query and receive additional input from the analysis engine 20. In general, the management application 37 is operative for managing all aspects of data usage across the enterprise, including risk assessment, permission management, auditing and reporting.

More particularly, the management application 37, is involved in generating convenient views of the composition of user groups, data access rights of individual users 14, and details of users or user groups having access rights to storage elements of the file system 12.

Storage of Access Privilege Information.

Figure 2:
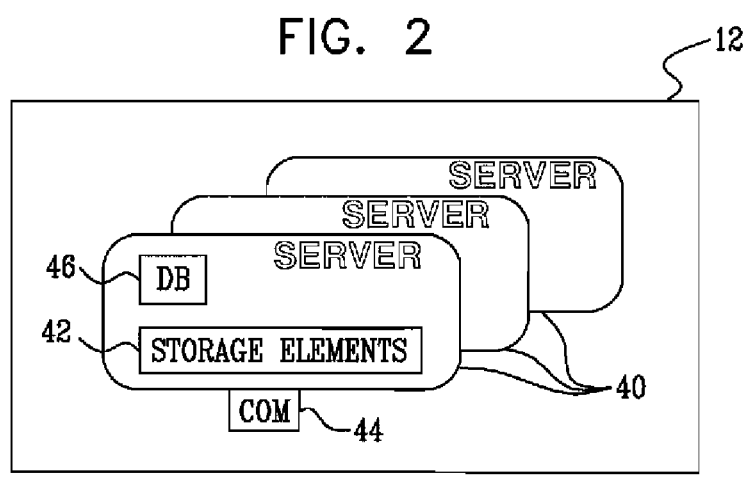
FIG. 2 is a detailed block diagram the data storage arrangements in the system shown in FIG. 1, in accordance with a disclosed embodiment of the invention.

Reference is now made to FIG. 2, which is a detailed block diagram of the file system 12 (FIG. 1) in accordance with a disclosed embodiment of the invention. The file system 12 comprises any number of individual servers 40, each storing enterprise data, represented as storage elements 42. The servers 40 are each provided with a conventional communications interface 44, through which they are linked to other elements of the system 10 (FIG. 1) using any suitable communications network. In one embodiment, the servers 40 each store information relating to data structure and user access privileges to their respective storage elements 42 in respective specialized databases 46, details of which are described below. The management application 37 (FIG. 1) can access the databases 46 when servicing queries regarding user access privileges. The databases 46 hold information in a highly condensed form, and do not unduly preempt needed storage on the servers 40.

Alternatively, the databases 46 can all reside on a specialized database server (not shown), in which case there is even less impact on storage of the servers 40. However database maintenance then requires more communications traffic between the specialized database server and the servers 40, which could degrade performance of the file system 12 in a busy production environment.

In order to populate the databases 46, it is assumed that the users 14 and the storage elements 42 throughout the file system 12 have been processed to define user clusters and data clusters, in which the users belonging to each user cluster have at least access privileges in common with the other users in that user cluster. Furthermore, access privileges to the storage elements in the data clusters can be related to sets of user clusters. The process of defining and maintaining the user clusters and the data clusters may be automated, as taught in the above-noted application Ser. No. 11/258,256. It should be noted that a user may itself be a user group. Furthermore, a user group may be a constituent of other user groups. Thus, many of the processes described below are performed recursively.

Graphical User Interface.

Figure 3:
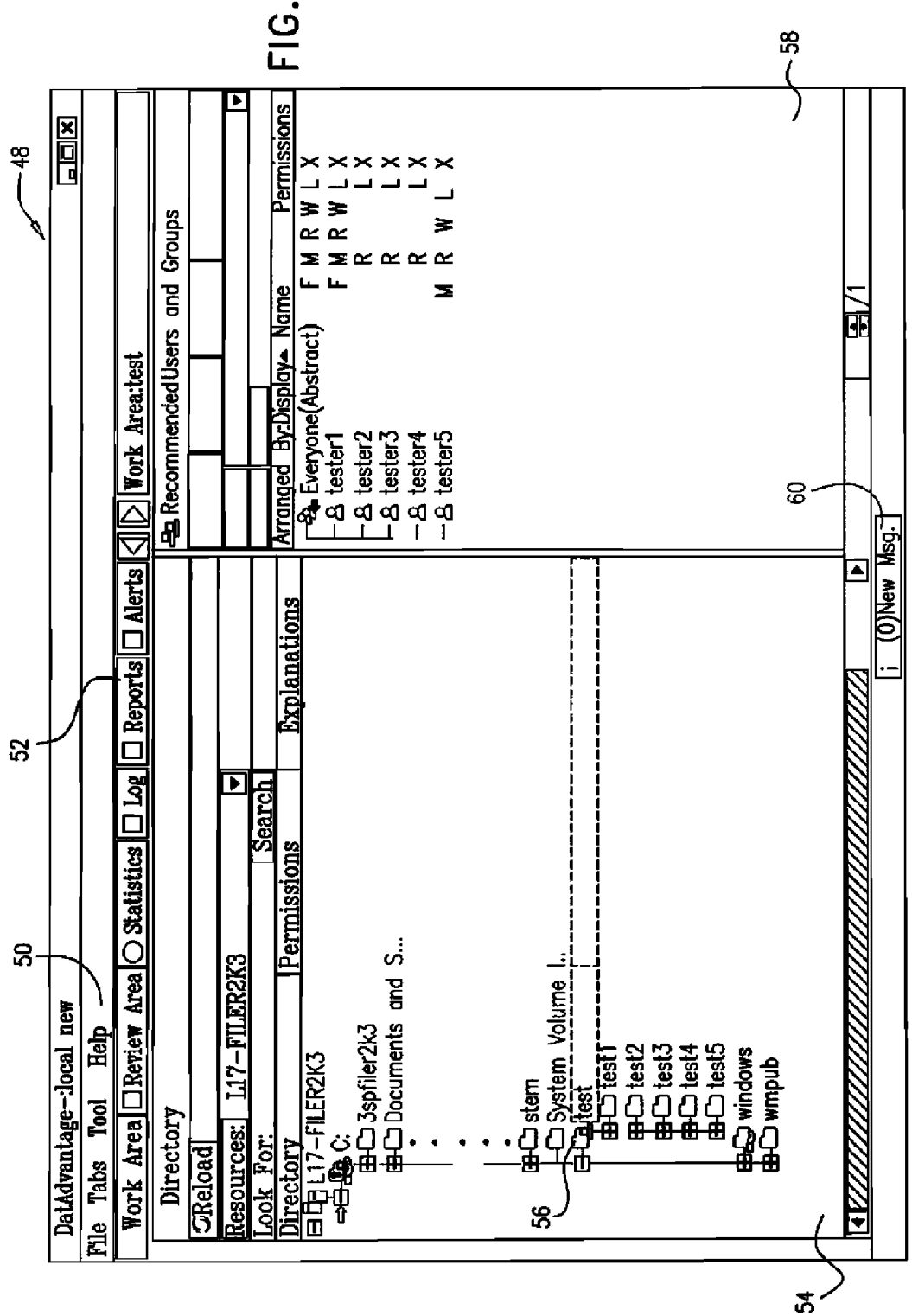
FIG. 3 illustrates a screen display presented by a user interface application in the system shown in FIG. 1, in accordance with a disclosed embodiment of the invention.

Referring again to FIG. 1, the management application 37, accesses the user repository 25, and cooperates with the user interface application 16 to offer several views that are useful for examination and modification of collected information. A summary view provides a high level overview of each of the monitored resources. Reference is now made to FIG. 3, which illustrates a screen 48 presented by the user interface application 16 (FIG. 1) in accordance with a disclosed embodiment of the invention. The screen 48 is comprised of several elements: a menu bar 50 at the top of the screen, a toolbar 52 featuring selection icons that invoke specialized functions of the management application 37, and an entity pane 54 that displays the presently existing status of monitored resources. In the example of FIG. 3, the pane 54 shows that monitored directory 56 "test" has been selected, and several subdirectories (test1-test6). The screen 48 has a pane 58 displaying a proposed list of users and their access rights to the directory 56. While not shown in the example of FIG. 3, the pane 58 may also display the identities of user groups of which the proposed users are members, and which enable their accesses to the directory 56.

In addition, the screen 48 includes a status bar 60 at the bottom of the screen, which displays operation status, software messages and errors. While not shown in FIG. 3, the screen 48 may also include a panel for displaying an error list, and can present a showing contextual display, which is based on the entity selected in the pane 54.

The panes 54, 58 together constitute a work area, which is the main working environment for use with the management application 37 (FIG. 1). It provides full visibility of the user repository 25, e.g., Active Directory, and allows the directory structure and permissions in the organization to be viewed. The screen 48 enables editing of users, user groups and file access permissions over any number of file servers, local and remote, throughout the enterprise.

As noted above, the panes 54, 58 can existing directories, users and user groups, which are potentially aggregated from hundreds of servers. The pane 54 reflects the actual entities in the environment. The pane 58 displays recommendations for user group membership and file access rights. The panes 54, 58 thus provide an integrated view of current user and group rights to files and directories. In addition, they display suggestions and manual changes made by qualified operators to file rights and user group membership.

Figure 4:
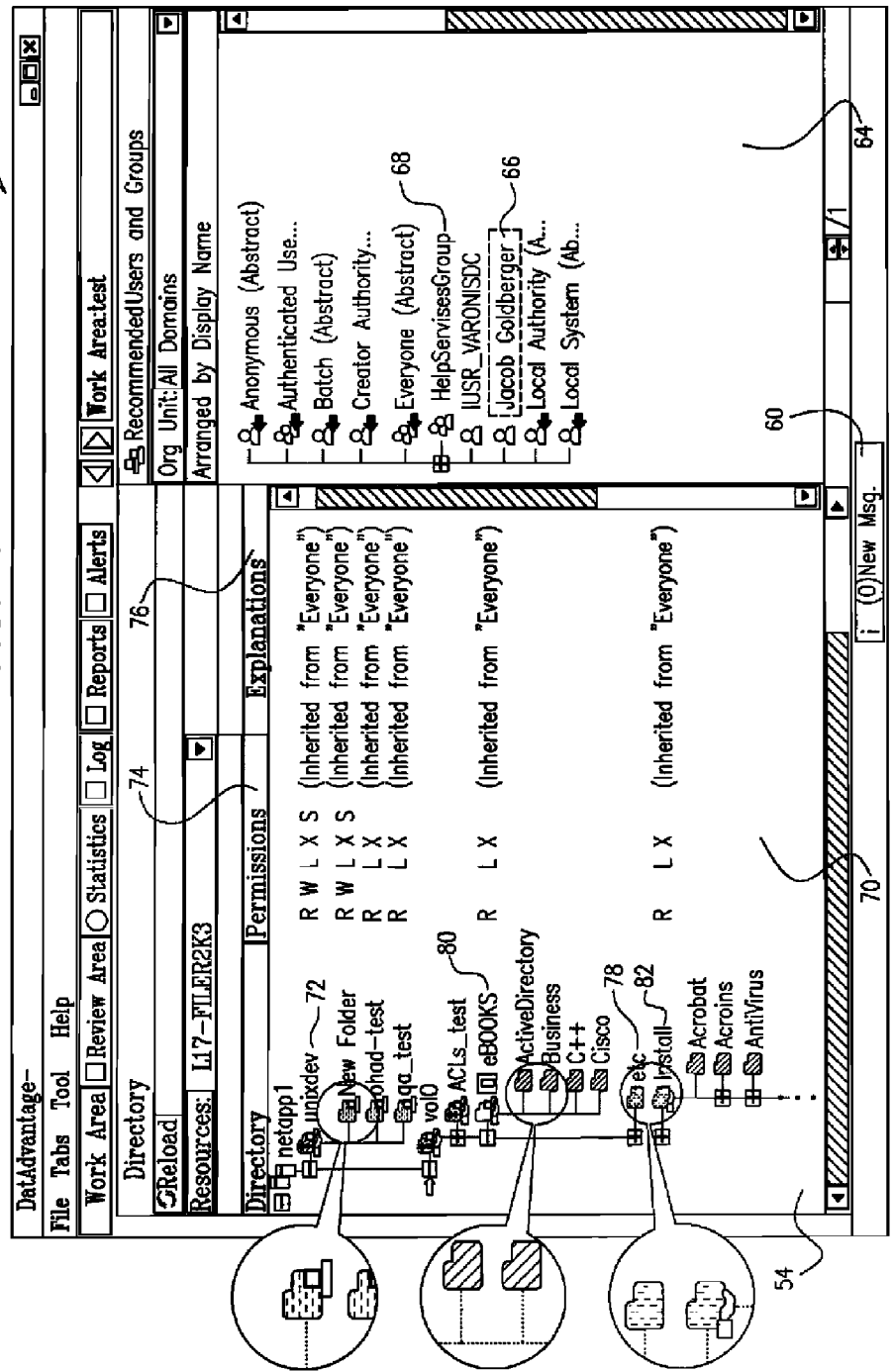
FIG. 4 illustrates another screen display presented by the user interface application in the system shown in FIG. 1, in accordance with a disclosed embodiment of the invention.

Reference is now made to FIG. 4, which illustrates another screen 62 presented by the user interface application 16 (FIG. 1) in accordance with a disclosed embodiment of the invention. A pane 64 has a list of users, some of whom are individuals, e.g., a selected user 66, and some are user groups, e.g., user group 68.

A pane 70 indicates directories to which the user 66 has access rights. Some of these rights are inherited by default (inherited from "everyone"), e.g., directory 72 ("unixdev") and its subdirectories. This type of inheritance is often a default on legacy systems, and presents a security vulnerability for complex organizations, which the system 10 (FIG. 1) alleviates in many ways. In particular, screens that are generated by the user interface application 16, such as the screen 48 (FIG. 3) and the screen 62, allow an operator to determine quickly the access rights to particular directories and the access rights of any particular user, or to set such rights, after which it may be desirable to delete the public inheritance from "everyone".

For directories to which the user 66 has access privileges, entries describing the access permissions appear in a permissions column 74 and an explanation column 76.

The user 66 does not have access permissions for directory 78 ("etc"), and no entries are shown in the permissions column 74 or the explanation column 76.

In the case of directory 80 ("ebooks") and directory 82 ("install"), permissions were originally inherited from "everyone" but subsequently limited, as shown in the permissions column 74.

Indications of the permission status of the directories may be emphasized by different visual characteristics, e.g., colors, of their respective icons, as can be seen by comparison of the icons of directories 68, 78, 80. It should be emphasized that the directories shown on the pane 70 could be distributed among many different servers, or could be on the same server. Of course, if the size of the lists on either or both of the panes 64, 70 exceeds the capabilities of the display, scrolling, sorting, filtering, and search facilities are available to the operator in order to locate and display desired information.

Figure 5:
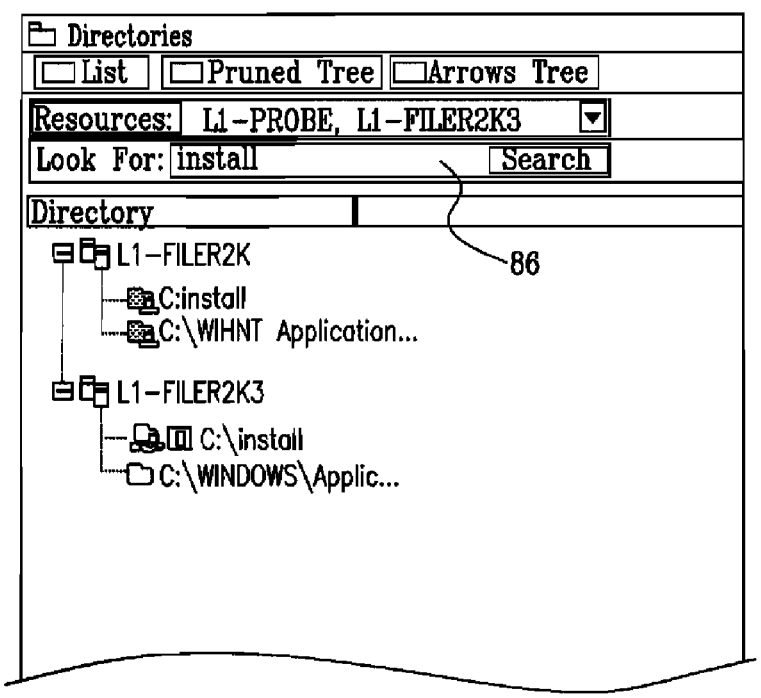
FIG. 5 a portion of the screen display of FIG. 3, showing a series of directories having derived relationships, in accordance with a disclosed embodiment of the invention.

Reference is now made to FIG. 5, which is a portion of screen display 84 showing a series of directories that is derived from the pane 54 (FIG. 3), in accordance with a disclosed embodiment of the invention. The display 84 can be navigated similar to a conventional Microsoft Windows™ display. The display 84 also features a search field 86, which enables the user to find desired resources. Depending on configuration, search results are presented as a list, a pruned tree in which insignificant results are omitted, or an "arrow tree", which is a tree display in which arrows indicate significant results.

Figure 6:
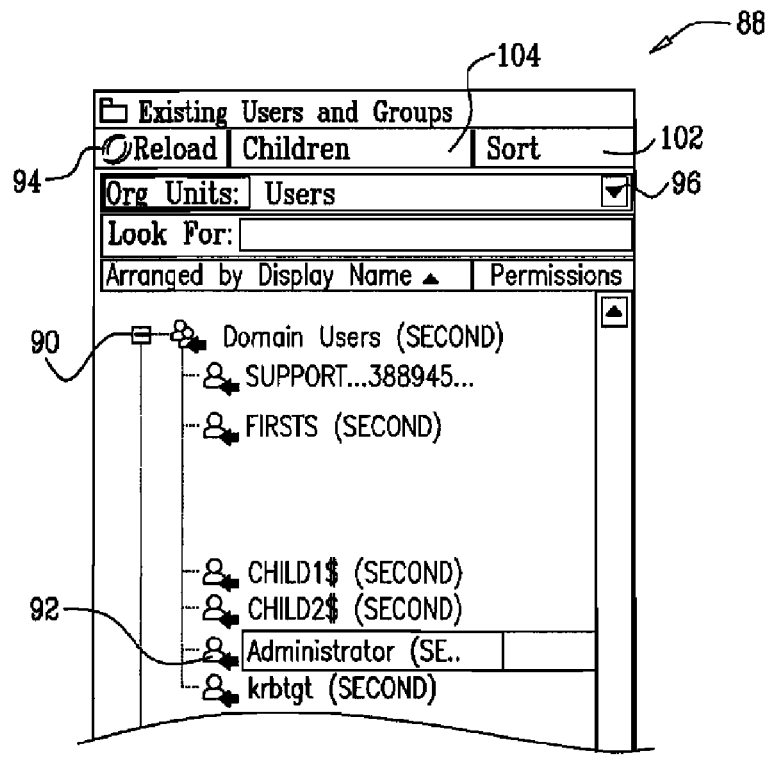
FIG. 6 is a portion of another screen display presented by the user interface application in the system shown in FIG. 1, and illustrating a list of users and user groups, in accordance with a disclosed embodiment of the invention.

Navigation of user and group lists, which are shown on the panes 54, 58 (FIG. 1), may involve traversing a hierarchical tree. Reference is now made to FIG. 6, which is a portion of a screen display 88 illustrating a list of users and user groups, in accordance with a disclosed embodiment of the invention. When the list is arranged by parents, user groups are displayed as main nodes of the tree, while each group's users are shown as subnodes. A user group 90 (Domain Users) heads the list. A user 92 (Administrator) is a member of the user group 90. Information may be updated using button 94 (Reload). Using a drop-down list 96, a member of a list of users and groups may be selected, after which only relevant user and user group elements are shown on the screen.

Figure 7:
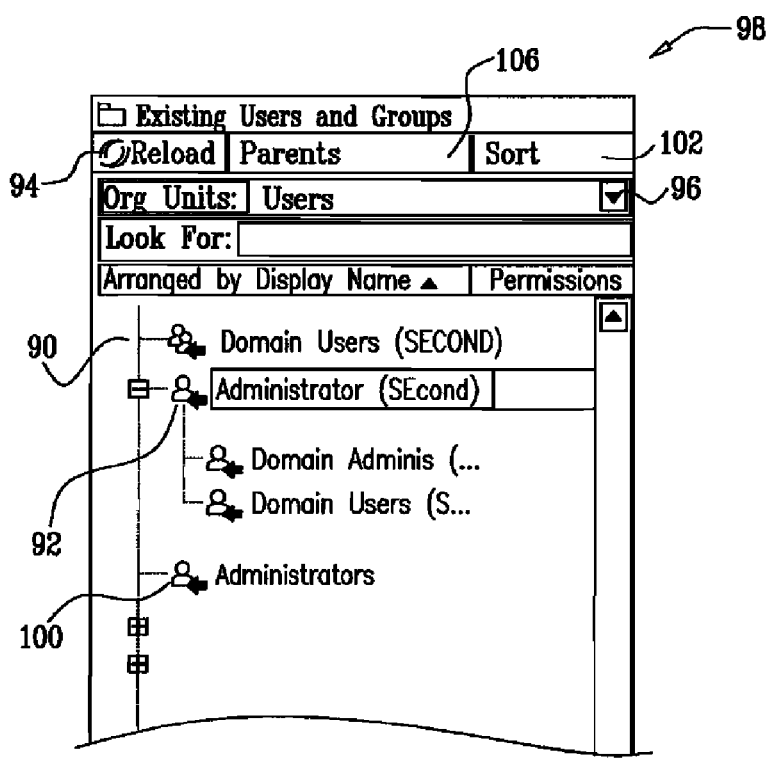
FIG. 7 is a portion of another screen display, which is similar to the display of FIG. 6, and is arranged by users, in accordance with a disclosed embodiment of the invention.

Reference is now made to FIG. 7, which is a portion of a screen display 98 in accordance with a disclosed embodiment of the invention. The display 98 is similar to the display 88 (FIG. 6), but is now arranged by users (children). In this display, users appear at the main nodes. User groups of which each user is a member are displayed at the subnodes. Thus, in FIG. 7, the user 92 (Administrator) is displayed at the top of the list. All the groups of which the user 92 is a member are displayed below his name, for example a user 100 (Administrators). The display may be sorted using button 102. Flags may be set and shown on the display. Such flags may mark a displayed entity as "read", "unread', or to indicate a need for follow-up reference.

A button invites the user to switch to between a view of arranged according to parents and a view arranged according to children. On FIG. 6, this is shown as button 104 labeled "Children", and on FIG. 7 as button 106 labeled "Parents".

Figure 8:
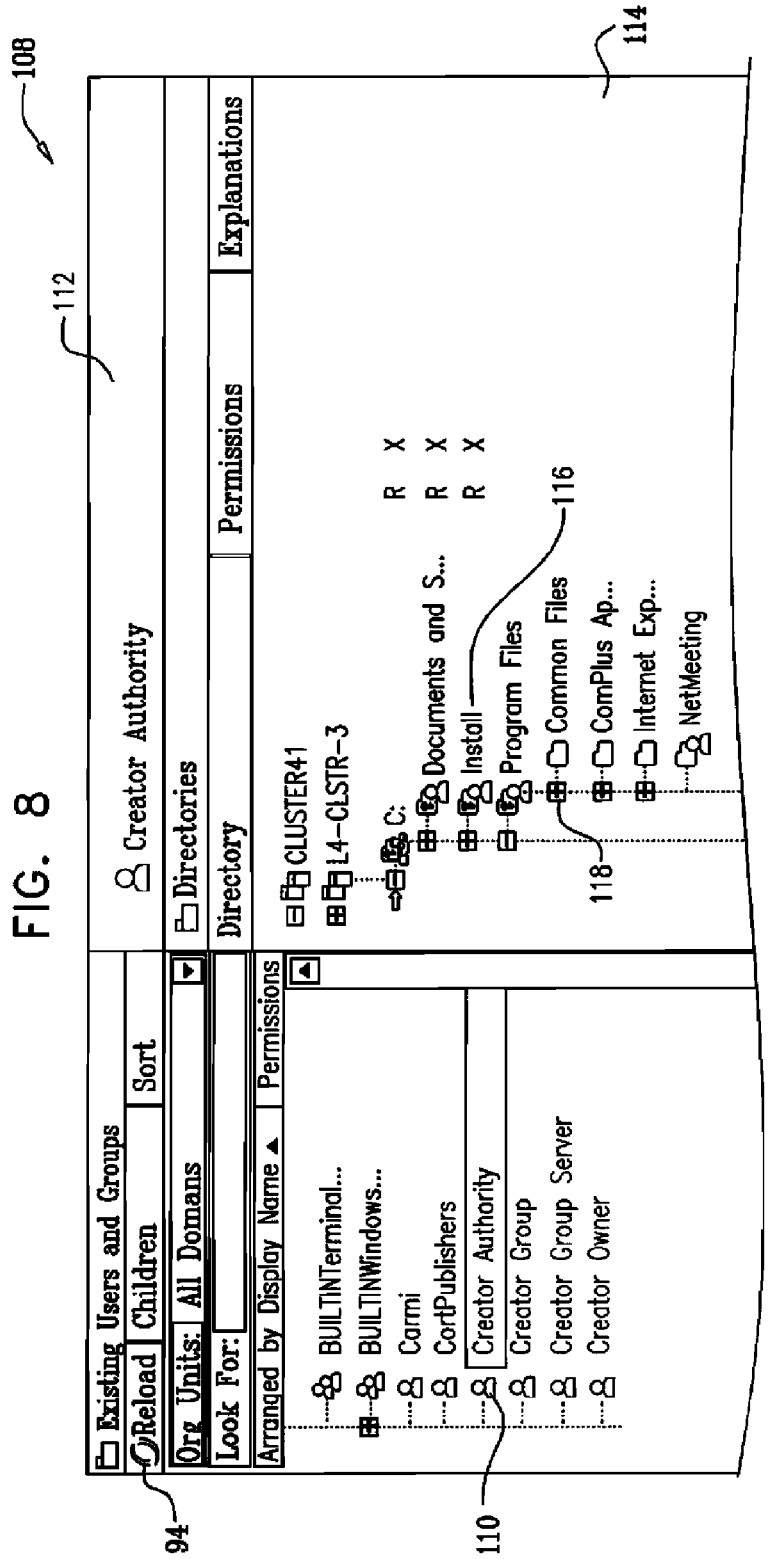
FIG. 8 is a screen display of access permissions in accordance with a disclosed embodiment of the invention.

Permissions may be viewed by displaying a view that is derived from the panes 54, 58 (FIG. 1). Reference is now made to FIG. 8, which is a screen display 108 of access permissions in accordance with a disclosed embodiment of the invention. In the left pane, which shows a list of existing users and groups, an existing user 110 (creator authority) has been selected. The name of the user 110 appears on the right pane as a caption 112. The access permissions of the user 110 are displayed in right pane 114. For example, the user 110 has read permissions to a directory 116 (install) and lacks access to common files 118.

Storage Details.

Directory Permissions.

Figure 9:
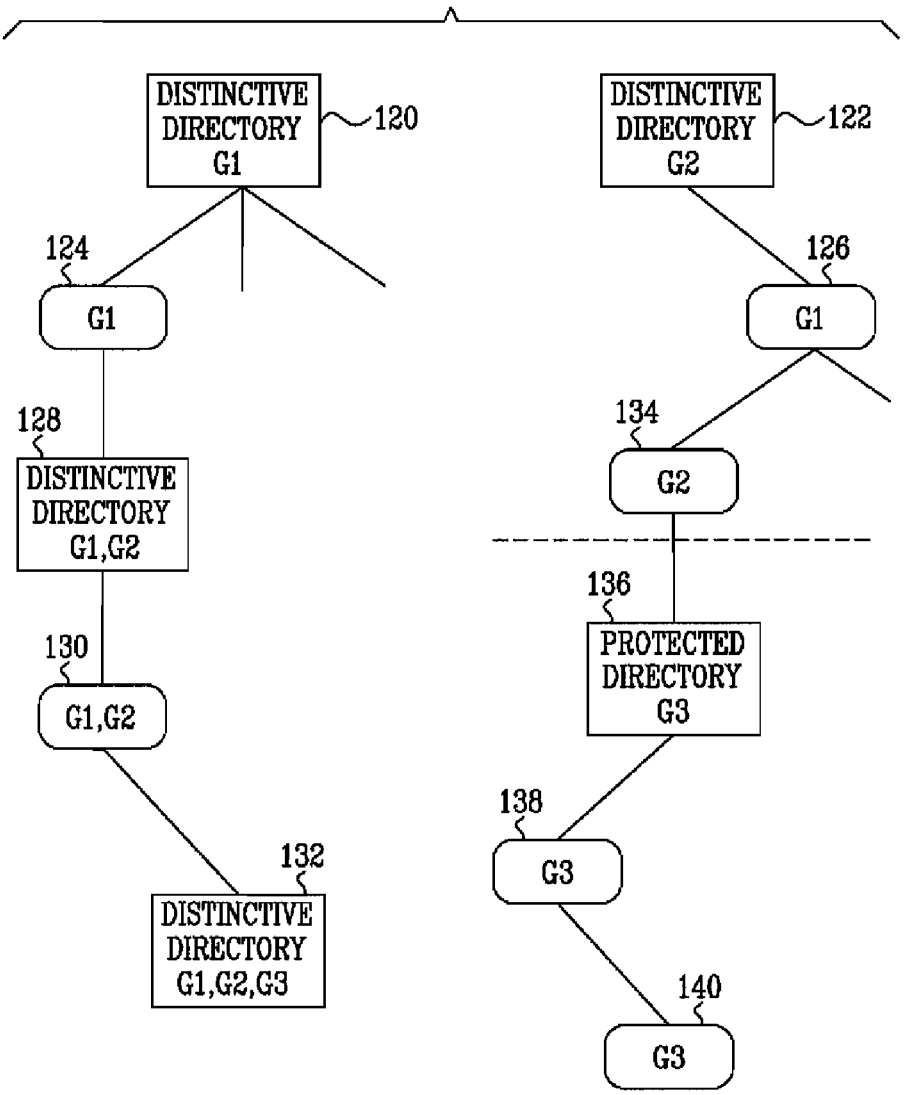
FIG. 9 is a fragmentary hierarchical representation of directory permissions in a file system, in accordance with a disclosed embodiment of the invention.

Reference is now made to FIG. 9, which is a fragmentary hierarchical representation of directory permissions in the file system 12 (FIG. 1), in accordance with a disclosed embodiment of the invention, in which two trees descend from respective root directories 120, 122, which may be located on different volumes of a file server, or on different file servers. FIG. 9 is helpful in understanding the principles of the invention that are described below. Access to the root directories 120, 122 is limited to user groups G1, G2, respectively. For example, the user groups G1 could be a highly privileged group of IT personnel. For example, the user group G2 might be composed of high level corporate officers.

In the second level of the hierarchies, directories 124, 126 inherit the permissions of their respective parents. Thus, just as in case of the root directories 120, 122, only user groups G1, G2 can respectively access the directories 124, 126.

For purposes of the following discussion, the root directories 120, 122 are termed "distinctive". The directories 124, 126 are termed "nondistinctive". A nondistinctive directory inherits all its permissions from a parent. A distinctive directory does not inherit all its permissions from a parent. As will be seen from the discussion below, the fact that the nondistinctive directories 124, 126 have identical permission profiles as their parents can be exploited in a database to limit storage requirements and to greatly reduce query latency. In practice, most directories in an organizational file system are nondistinctive.

Continuing down the hierarchy on the left side of FIG. 9, on the third level, directory 128 can be accessed by user groups G1 and G2. The directory 128 inherits some, but not all of its permissions from its parents. Therefore, the directory 128 is a distinctive directory. Directory 130, inheriting all its permissions from its parent, i.e., directory 128, can be accessed by user groups G1 and G2. Directory 130 is therefore nondistinctive. Directory 132 can be accessed by user groups G1, G2, and G3. Since directory 132 has permissions in addition to those of its parent, directory 130, directory 132 is distinctive. It will be noted that in the hierarchy, the distinctive directories generally have permissions in addition to those of their parents. Except in the case of protected directories, which are described below, permissions are not deleted from child directories, only fully inherited and added.

In the hierarchy at the right side of FIG. 9, directory 134 inherits its permissions from its parent, directory 126 and is nondistinctive. It will also be seen from inspection of FIG. 9 that directory 134 ultimately inherits its permissions from root directory 122. Root directory 122 is the "closest" distinctive directory to directory 134.

Directory 136 is a child of directory 134. It can be accessed by user group G3. However, directory 136 cannot be accessed by user group G2. Directory 136 has not inherited its permissions from its parent, a point, which is emphasized by a broken line above directory 136. Rather, the permissions of directory 136 have been expressly set. Directory 136 is a "protected" directory. For purposes of inheritance of permissions by its descendants, directory 136 functions similarly to a root directory in a file system. No recourse to the parents of directory 136 is required (or permitted) when evaluating the permissions of the descendants of directory 136. Rather the descendants of directory 136 ultimately inherit their permissions from directory 136 and not from any ancestor of directory 136. Directory 136 is also a distinctive directory, as it has not inherited all its permissions from its parent, directory 134. Indeed, it has inherited none of them, although this is not necessarily the case. A protected directory may share at least some of the permissions of its parent.

Continuing down the hierarchy on the right, directory 138 and directory 140 are accessible by user group G3. These directories are nondistinctive, as explained above.

Figure 10:
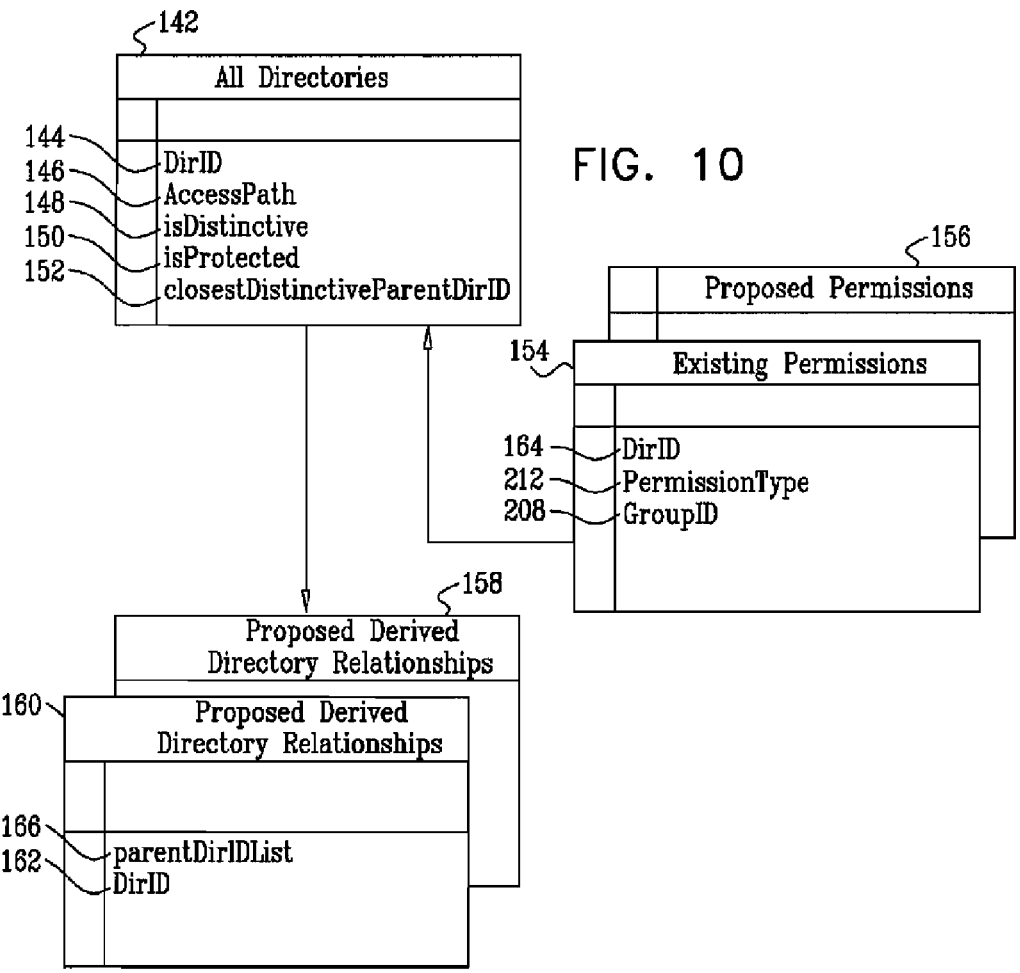
FIG. 10 is a block diagram illustrating a system of tables for store data relevant to retrieval of access permissions, in accordance with a disclosed embodiment of the invention.

Queries regarding access permissions are facilitated by a largely-precomputed and compact arranged database. This (1) accommodates the needed data in a practical storage device, and (2) assure retrieval of desired information within a feasible time frame. Reference is now made to FIG. 10, which is a block diagram illustrating a system of tables that store such data. The results of executing a query using the tables in FIG. 10 is seen in FIG. 3, which is further described below. A record layout is presented for each of the tables. The tables shown are maintained for each of file server of interest throughout the enterprise, and may be physically consolidated on a single server for convenience of access.

A table 142 holds information pertaining to all storage directories on a particular server. In general, directories are arranged in a tree hierarchy having any number of levels. Entries in the table 142 are collected form any number of storage devices, on different types of computer systems, and typically remote from one another. One entry exists for each directory that is being monitored. A field 144 (DirID) holds a unique identifier for a directory. This identifier is not necessarily the directory's display name. A field 146 (accessPath) holds the directory's access path. A field 148 (isDistinctive) indicates whether the directory is a distinctive directory. A field 150 (isProtected) indicates whether the directory is a protected directory. A field 152 (closestDistinctiveParentDirID) contains an indication of the closest distinctive parent directory in the hierarchy. In the cases of root and distinctive directories, the fields 144, 152 are identical.

Table 154 stores records of actual permissions on the file system. One entry in table 154 exists for each non-inherited permission, which may be represented by a tuple (Dir, Gp). For example, the directory 128 (FIG. 9) can be accessed by two user groups G1, G2. The table 154 relating to directory 128 would have one entry, corresponding to the non-inherited permission to access the group G2. The directory 124, a nondistinctive directory, is not represented in the table 154, although it would have an entry in the table 142. The root directory 120 would have one entry, corresponding to the non-inherited permission to access the group G1. As nondistinctive directories that are found on the table 142 are omitted from the table 154, the table 154 is generally much smaller than the table 142. Obtaining permissions of the directory 128 can be obtained by accessing its entries in the table 154 to obtain non-inherited permissions, identifying all its distinctive ancestral directories, and concatenating their respective non-inherited permissions to obtain a full set of permissions. This process is explained below in further detail.

As noted above, the system 10 (FIG. 1) is capable of presenting, and even suggesting changes in directory permissions and user group memberships. A parallel system of pre-computed tables incorporating such proposals is maintained. The structures of tables 156, 158 are identical to tables 154, 160, respectively, except that proposed changes are represented instead of the actual state of the file system. Queries dealing with proposed changes are executed with reference to the parallel system of tables, e.g., table 156 and results would be displayed in the right pane 58 (FIG. 3). Results of the same query, executed using table 154, would be displayed in the left pane 54. In the case of versions dealing with proposals, user group references in the table are to proposed user group configurations, as explained below.

A pre-computed table 160 holds derived relationships among the directories in the table 142 The term "derived relationships" refers to relationships only among distinctive directories in a hierarchy of storage elements. The table 160 is a key factor in accelerating the performance of queries. Each entry contains information for a distinctive directory, and pointers to all distinctive ancestral directories. Nondistinctive directories are omitted from the table 160.

Each entry includes a field 162 (DirID), which corresponds to an instance of field 164 in table 154, and functions as a pointer or index into table 154. A field 166 (parentDirIDList) is a list of identifiers of all distinctive ancestral directories of the directory identified in field 164. Traversal of the list enables each distinctive ancestral directory to be accessed in the other tables in FIG. 10.

Often a directory has inherited some of its permissions from its parent and additionally has some additional, non-inherited permissions that are lacking in the parent. The difference between the directory's permissions and the parent's permissions are sometimes referred to herein as a "delta". Only the delta, that is the non-inherited permissions, need be stored in the table 154. The full scope of the permissions of the exemplary directory can be obtained by retrieving the delta from the table 154, and combining the delta with the permissions of the table's ancestors. This process may be recursive and is accomplished as follows:

(1) Consult the table 160 to determine ancestral relationships of the subject directory.
(2) Retrieve all non-inherited permissions from ancestral directories by one or more lookup operations in the table 154 using ancestral directory identifiers in the field 166.
(3) Combine inherited with non-inherited permissions.

Queries regarding nondistinctive directories can be executed by first identifying the closest distinctive ancestral directory. The permissions of the two are identical.

User Groups.

Figure 11:
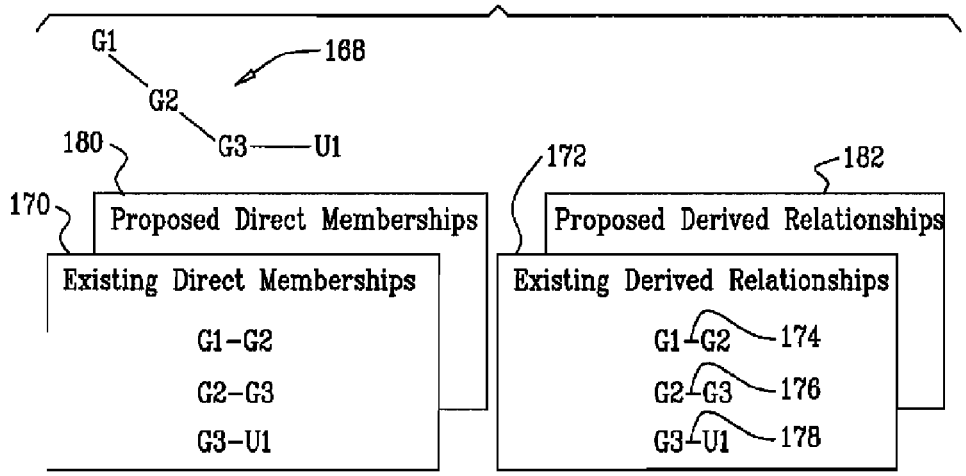
FIG. 11 a block diagram illustrating storage of inherited permissions from parent directories in accordance with a disclosed embodiment of the invention.

Reference is now made to FIG. 11, which is a block diagram illustrating aspects of user group composition, in accordance with a disclosed embodiment of the invention. In order to visualize the permissions of an exemplary user U1 with respect to directories in the file system, it is often necessary to determine the user groups to which the user U1 belongs. Referring to diagram 168 in the upper part of FIG. 11, a hierarchical relationship of user groups G1, G2, G3 is shown, in which the user U1 has membership in user group G3. However, the user group G3 is itself a member of user group G2, which in turn is a member of user group G1. These relationships, known as "direct memberships", are stored as raw data in a table 170, available in advance of any query whose execution would reference the table. Table 170 is updated as the enterprise group structure changes. In some embodiments, a process, such as a daemon, monitors changes in group membership and composition.

It is possible that the membership of user U1 in user group G3 is restricted to user group G3. That is, user U1 may not be a member of user groups G1, G2. However, user U1 may enjoy the access rights accorded to user group G1 by virtue of user group G3's membership in user group G1 or G2. This information is prerecorded in table 172, a table of derived group relationships.

In the example of FIG. 11, table 172 holds derived relationships relevant to the user groups G1, G2, G3. For example, entry 174 indicates that user group G2 is a member of user group G1. In entry 176, the status of user group G3 as a member of user group G2 is shown. Entry 178 shows a derived relationship, in which the user group G3 has access privileges ultimately derived from the access privileges of user group G1. As will be apparent from the description below, entry 178 is a key factor in accelerating execution of queries regarding the privileges of the user U1, as the recursion needed to describe privileges of the user group G3 that derive from its remote ancestral user group G1 has already been performed and need not be repeated when servicing queries. The entries 174, 176, 178 occupy relatively little storage space.

The system maintains tables 180, 182, which are parallel versions of the tables 170, 172, in which proposed group organization and memberships are recorded. Queries dealing with such proposals are serviced by reference to the tables 180, 182 instead of the tables 170, 172.

Query 1.

A query commonly executed by the management application 37 (FIG. 1) is a request to determine whether a user U can access a directory D. Referring again to FIG. 3, in which privileges of sets of users with respect to sets of directories are presented in an integrated view, the integrated view is developed by iterating the queries over the sets. In each iteration, the strategy is to determine whether there is an intersection of the union of the set of user groups in which the user U has direct or indirect membership with the set of user groups entitled to access directory D. The latter is calculated by determining the union of the sets of access rights of all distinctive directories relating to the directory D, as described above with reference to FIG. 9. If such an intersection exists, the integrated view of FIG. 3 would code the directory D as accessible to the user U. It will be recalled that this query can be presented for both existing permissions and recommended permissions. A direct comparison can be made on the integrated view of FIG. 3, permitting the consequences of implementing such recommendations to be immediately visualized.

Figure 12:
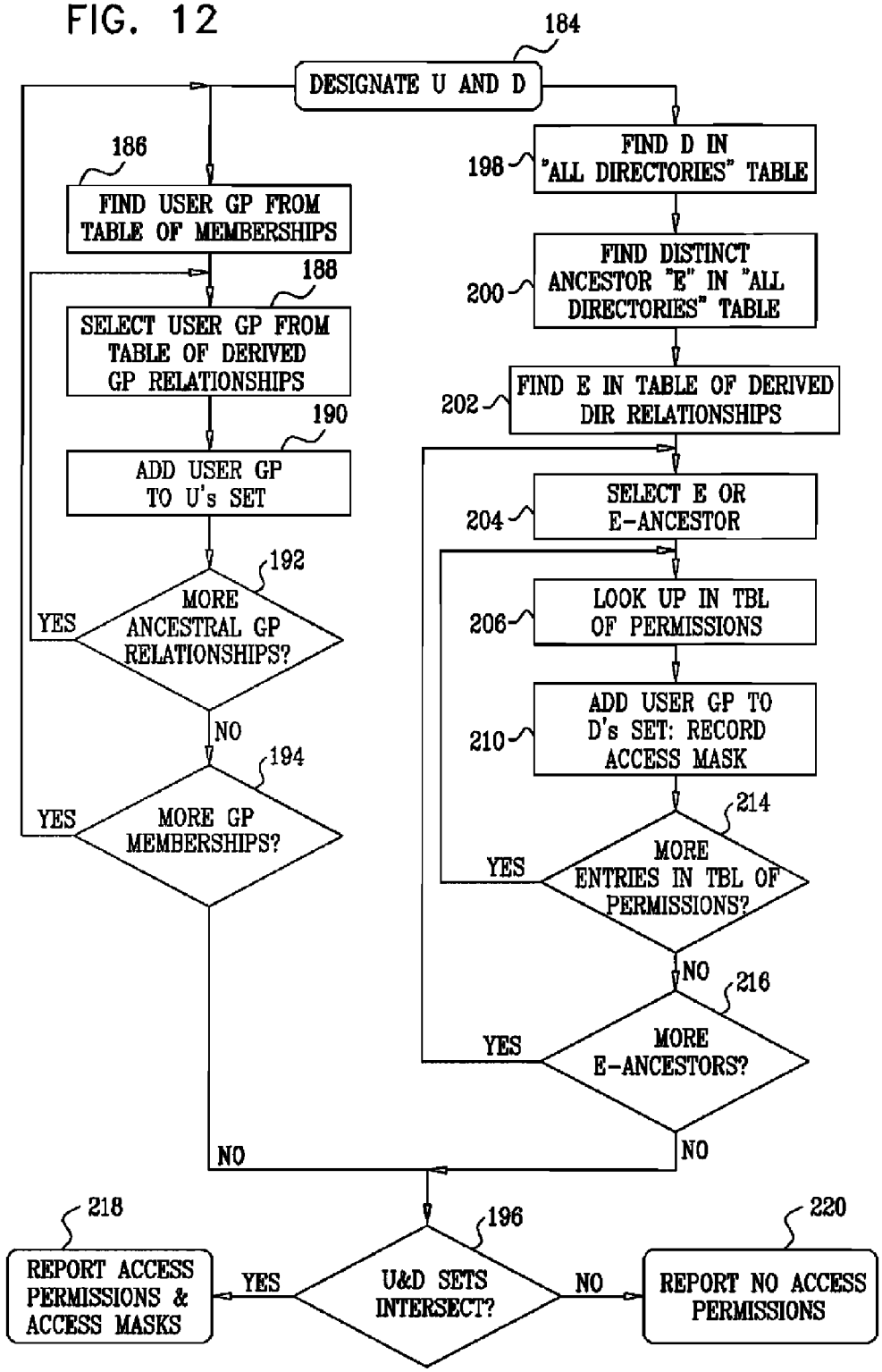
FIG. 12 is a flow chart of a method for executing a query to visualize a user's access privileges to directories in an enterprise file system, in accordance with a disclosed embodiment of the invention.

Reference is now made to FIG. 12, which is a flow chart of a method of determining whether a user can access a directory in a file system, in accordance with a disclosed embodiment of the invention.

At initial step 184 a user U and a directory D are designated. In the following description, all the user groups from which the user U derives access rights are scanned, recognizing from the previous description that user groups may be members of other user groups. The recursive operations required have previously been performed and recorded in the form of tables that can be quickly referenced.

At step 186, the user U is first located in a table of group memberships, (e.g., table 170, FIG. 11) and additional details are subsequently obtained from a lookup of table entries describing derived group relationships (e.g., table 172, FIG. 11). If the user U belongs to more than one user group, there are multiple entries in the table of group memberships. The current entry in this table includes a user group identification field identifying a current user group.

At step 188 a table of derived group relationships (e.g., table 172, FIG. 11) is consulted. The tables of derived group relationships and group memberships are related by user group identification fields. The entry thus found in the table of derived group relationships includes the current user group and all encapsulating ancestral user groups of which the current user group is directly or indirectly a member. One of these ancestors (or the current user group itself) is selected.

Next, at step 190 the user group selected in step 188 is added to a set of user groups in which the user U participates, either directly or by virtue of membership in an ancestral group. This set is referred to as a user-oriented set of user groups.

Control now proceeds to decision step 192, where it is determined if there are more ancestral user group relationships recorded in the current entry of the table of derived group relationships. If the determination at decision step 192 is affirmative, then control returns to step 188.

If the determination at decision step 192 is negative, then control proceeds to decision step 194, where it is determined if more user groups entries for the user U remain to be evaluated in the table of group memberships. If the determination at decision step 194 is affirmative, then control returns to step 186.

If the determination at decision step 194 is negative, then a comprehensive set of group memberships has been developed for the user U. Control proceeds to decision step 196, which is described below.

The following sequence, at the right of FIG. 12, describes accumulation of user groups entitled to access the directory D. As shown in FIG. 12, it may be performed concurrently with steps 188, 190, 194. As in the case of the user U, relationships of the directory D and its antecedents have been pre-computed. In step 198 an "all directories" table is consulted (e.g., table 160, FIG. 10) is consulted, and an entry for the directory D identified.

Next, at step 200 the closest distinctive ancestor of the directory D is identified, referred to herein as "directory E", and its entry referenced in the all directories table. In the exemplary table 160 (FIG. 10), this is done by reference to field 152. If the directory D is itself a distinctive directory, the fields 144, 152 will be identical, and no further table lookup is required, as directory D and directory E are identical.

An entry for the directory E in a table of derived directory relationships (e.g., Table 160, FIG. 10) is referenced at step 202. This entry is keyed to the directory identifier for the directory E in the current entry of the all directories table. In the example of FIG. 10, field 144 and field 162 both identify the directory E.

The entry in the table of derived directory relationships for the directory E includes a list of distinctive ancestral directories of the directory E (field 166, FIG. 10). At step 204, a distinctive directory identifier is selected from the list. It should be noted that the directory E itself, being distinctive, is also a candidate for selection in step 204.

Next, at step 206 a table of permissions is consulted (e.g., Table 154, FIG. 10). The tables of permissions derived directory relationships are related by directory identification fields (field 164 and a current identifiers in the list of field 166, FIG. 10). The entry in the table of permissions has a field containing an identifier of a user group (field 208, FIG. 10) that is entitled to access the currently selected distinctive directory.

Next at step 210, the user group identified in step 206 is added to a set of user groups entitled to access the directory D. This set is termed a directory-oriented set of user groups.

In the current embodiment, each entry in the table of permissions is a tuple of a distinctive directory identifier and a user group identifier. Thus, multiple entries may exist in the table for a distinctive directory. It is often desirable at this point to memorize the range of permissions of the current user group that was identified in step 206. This information may be stored in a mask (e.g., field 212, FIG. 10). A logical OR operation can be performed using this mask and with a data developed from other iterations of step 210. The maximal access rights to the directory E are thus recorded.

Control now proceeds to decision step 214, where it is determined if there are more entries for the current distinctive directory selected in step 204 in the table of directory permissions. If the determination at decision step 214 is affirmative, then control returns to step 206.

If the determination at decision step 214 is negative, then control proceeds to decision step 216, where it is determined if more entries in the list of distinctive ancestral directories in the current entry in the table of derived directory relationships remain to be processed.

If the determination at decision step 216 is affirmative, then control returns to step 204.

If the determination at decision step 216 is negative, then a comprehensive set of user groups entitled to access the directory D has been established. It will again be recalled that access rights to the nondistinctive instances of the directory D are inherited from the directory E.

Control now proceeds to decision step 196, where a determination is made whether the set of user groups entitled to access the directory D has an intersection with the set of user groups of which user U has rights.

If the determination at decision step 196 is affirmative, then control proceeds to final step 218. The user U is reported as having access permission for the directory D. The particular access rights and the identity of at least one of the user groups enabling user U's access to directory D are optionally reported, based on information recorded in step 210. Appropriate graphical indications and explanations are provided when there is a difference between existing and proposed access permissions. For example, deletion of access rights user U to directory D may be proposed. An explanation is provided for the lack of access permissions of U to D. Typical explanations may be, e.g., removal of U for a user group or deletion from an entire user group.

If the determination at decision step 196 is affirmative, then control proceeds to final step 220. The user U is reported as not having access to the directory D.

In practice query 1 is accomplished using only a few lookups. Searching large access control lists, file allocation tables is unnecessary, as the relationships among the user groups and distinctive directories have been prepared in advance. While the process steps shown in FIG. 12 have been presented in a particular linear order for clarity, in practice, they may be implemented as concurrent processes or threads. Furthermore, the performance of decision step 196 need not await full traversal of the group table entry nor the list of parent directory identifiers, but can be performed whenever a user group is added to the set of user groups of the user U or the directory D. If an intersection is found, the process can terminate immediately. Referring again to FIG. 3, by performing the query a first time using the tables of existing permissions and group memberships and a second time using the tables of proposed permissions and group memberships. The difference between results of the two queries can be presented side-by-side on different panes with the differences therebetween graphically indicated, e.g., by highlighting to identify members of the intersection.

It will be evident that in a large enterprise, the visible displays of FIG. 3 (and FIG. 4) comprise only windowes into the directories and users capable of being displayed, even when compact presentations such as pruned trees are employed. Thus, an operator may visualize a different set of directories or users, e.g., by scrolling, or using other navigational controls. Indeed, the operator may have no need to view details of the entire organizational file system, but only fragments of interest. Since the query is executable in near real-time, it can be iterated and new results displayed whenever the user identifies another window of current interest.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for displaying data access privilege status for data in an enterprise, comprising:
    defining user groups offering common rights of access to a plurality of file servers, said user groups comprising ancestral user groups having members that are other user groups, and participant members of said other user groups having access rights that derive from said user groups and respective ancestral user groups thereof, said file servers being organized as a hierarchy of storage elements having ancestors;
    maintaining a user database of said user groups and said members, entries in said user database comprising identifiers of respective said ancestral user groups;
    maintaining a storage element permissions database containing only non-inherited access permissions for distinctive storage elements, and an inheritance indicator employing identical permission profiles, that identifies other said distinctive storage elements that are ancestral thereto in said hierarchy thereby to reduce data storage requirements;
    consulting said user database to determine a user-oriented set of user groups offering respective said common rights of access to selected ones of said participant members;
    consulting said storage element permissions database to determine a storage element-oriented set of said user groups that provide said common rights of access to selected ones of said storage elements; and
    reporting members of said storage element-oriented set and said user-oriented set.

2. The method according to claim 1, further comprising the steps of:
    making a determination that said user-oriented set has an intersection with said storage element-oriented set; and
    responsively to said determination issuing a report that said participant members are able to access said selected ones of said storage elements.

3. The method according to claim 1, wherein said user database comprises:
    a table of memberships having entries identifying ones of said user groups that respectively offer said common rights of access to said participant members; and
    a table of relationships having entries identifying respective relationships among said user groups and said ancestral user groups thereof, the method further comprising the steps of:
    prior to performing said step of consulting said user database, constructing said table of memberships and said table of relationships and updating said table of memberships and said table of relationships responsively to changes in a composition of any of said user groups.

4. The method according to claim 1, wherein said storage element permissions database comprises:
   a table of permissions having entries that identify one of said user groups and a respective one of said storage elements;
   a table of derived relationships having entries that identify one of said storage elements and a respective instance of said list, the method further comprising the steps of:
      prior to performing said step of consulting said storage element permissions database constructing said table of permissions and said table of derived relationships and updating said table of permissions and said table of derived relationships responsively to changes in said access permissions.

5. A computer product for displaying data access privilege status for data in an enterprise, including a non-transitory, tangible computer-readable medium in which computer program instructions are stored, which instructions, when read by a computer, cause the computer to define user groups possessing common rights of access to a plurality of file servers, said user groups comprising ancestral user groups having members that are other user groups, and participant members of said other user groups having access rights that derive from said user groups and respective ancestral user groups thereof, said file servers being organized as a hierarchy of storage elements having ancestors, maintain a user database of said user groups and said members, entries in said user database comprising identifiers of respective said ancestral user groups, maintain a storage element permissions database containing only non-inherited access permissions for distinctive storage elements and an inheritance indicator employing identical permission profiles, that identifies other said distinctive storage elements that are ancestral thereto in said hierarchy thereby to reduce data storage requirements, consult said user database to determine a user-oriented set of user groups offering respective said common rights of access to selected ones of said participant members, consult said storage element permissions database to determine a storage element-oriented set of said user groups that offer provide said common rights of access to selected ones of said storage elements, respectively, and reporting members of said storage element-oriented set and said user-oriented set.

6. The computer software product according to claim 5, wherein said computer is further instructed to make a determination that said user-oriented set has an intersection with said storage element-oriented set and responsively to said determination issue a report that said participant members are able to access said selected ones of said storage elements.

7. The computer product according to claim 5, wherein said user database comprises:
   a table of memberships having entries identifying ones of said user groups that respectively offer said common rights of access to said participant members; and
   a table of relationships having entries identifying respective relationships among said user groups and said ancestral user groups thereof, wherein said computer is further instructed to construct said table of memberships and said table of relationships and update said table of memberships and said table of relationships responsively to changes in a composition of any of said user groups prior to a consultation of said user database.

8. The computer product according to claim 5, wherein said storage element permissions database comprises:
   a table of permissions having entries that identify one of said user groups and a respective one of said storage elements; and
   a table of derived relationships having entries that identify one of said storage elements and a respective instance of said list, wherein said computer is further instructed to construct said table of permissions and said table of derived relationships and update said table of permissions and said table of derived relationships responsively to changes in said access permissions prior to a consultation of said directory database.

9. A data processing system for displaying data access privilege status for data in an enterprise, comprising:
   a processor linked to a plurality of file servers, said file servers being organized as a hierarchy of storage elements having ancestors,
   a display; and
   a memory accessible by said processor, wherein said processor is operative to define user groups possessing common rights of access to said file servers, said user groups comprising ancestral user groups having members that are other user groups, and participant members of said other user groups having access rights that derive from said user groups and respective ancestral user groups thereof, to maintain a user database of said user groups and said members, entries in said user database comprising identifiers of respective said ancestral user groups and to maintain a storage element permissions database containing only non-inherited access permissions for distinctive storage elements and an inheritance indicator employing identical permission profiles, that identifies other said distinctive storage elements that are ancestral thereto in said hierarchy thereby to reduce data storage requirements, to consult said user database to determine a user-oriented set of user groups offering respective said common rights of access to selected ones of said participant members and consult said storage element permissions database to determine a storage element-oriented set of said user groups that provide said common rights of access to selected ones of said storage elements, and to report members of said storage element-oriented set and said user-oriented set.

10. The data processing system according to claim 9, wherein said processor is operative to make a determination that said user-oriented set has an intersection with said storage element-oriented set and responsively to said determination issue a report that said participant members are able to access said selected ones of said storage elements.

11. The data processing system according to claim 9, wherein said user database comprises:
   a table of memberships having entries identifying ones of said user groups that respectively offer said common rights of access to said participant members; and
   a table of relationships having entries identifying respective relationships among said user groups and said ancestral user groups thereof, wherein said processor is operative to construct said table of memberships and said table of relationships and update said table of memberships and said table of relationships responsively to changes in a composition of any of said user groups prior to a consultation of said user database.

12. The data processing system according to claim 9, wherein said storage element permissions database comprises:

a table of permissions having entries that identify one of said user groups and a respective one of said storage elements; and a table of derived relationships having entries that identify one of said storage elements and a respective instance of said list, wherein said processor is operative to construct said table of permissions and said table of derived relationships and update said table of permissions and said table of derived relationships responsively to changes in said access permissions prior to a consultation of said storage element permissions database.

* * * * *